(12) United States Patent
van Rietschote (10) Patent No.: US 6,757,778 B1
(45) Date of Patent: Jun. 29, 2004

(54) STORAGE MANAGEMENT SYSTEM

(75) Inventor: Hans F. van Rietschote, Sunnyvale, CA (US)

(73) Assignee: Veritas Operating Corporation, Mountain View, CA (US)

( * ) Notice: Subject to any disclaimer, the term of this patent is extended or adjusted under 35 U.S.C. 154(b) by 221 days.

(21) Appl. No.: 10/140,614

(22) Filed: May 7, 2002

(51) Int. Cl.⁷ .............................................. G06F 12/08
(52) U.S. Cl. ........................................................ 711/6
(58) Field of Search ........................... 711/6, 112, 114, 711/170

(56) References Cited

U.S. PATENT DOCUMENTS

| | | | |
|---|---|---|---|
| 4,912,628 A | | 3/1990 | Briggs |
| 4,969,092 A | | 11/1990 | Shorter |
| 5,257,386 A | | 10/1993 | Saito |
| 5,408,617 A | | 4/1995 | Yoshida |
| 5,621,912 A | | 4/1997 | Borruso et al. |
| 5,852,724 A | | 12/1998 | Glenn, II et al. |
| 5,872,931 A | | 2/1999 | Chivaluri |
| 5,944,782 A | | 8/1999 | Noble et al. |
| 6,029,166 A | | 2/2000 | Mutalik et al. |
| 6,075,938 A | | 6/2000 | Bugnion et al. |
| 6,151,618 A | | 11/2000 | Wahbe et al. |
| 6,230,246 B1 | * | 5/2001 | Lee et al. ................. 711/167 |
| 6,298,390 B1 | | 10/2001 | Matena et al. |
| 6,298,428 B1 | | 10/2001 | Munroe et al. |
| 6,324,627 B1 | | 11/2001 | Kricheff et al. |
| 6,341,329 B1 | | 1/2002 | LeCrone et al. |
| 6,363,462 B1 | | 3/2002 | Bergsten |
| 6,397,242 B1 | | 5/2002 | Devine et al. |
| 6,438,642 B1 | * | 8/2002 | Shaath ................... 711/100 |
| 6,493,811 B1 | * | 12/2002 | Blades et al. ............ 711/203 |
| 6,496,847 B1 | | 12/2002 | Bugnion et al. |
| 2001/0016879 A1 | | 8/2001 | Sekiguchi et al. |
| 2003/0033431 A1 | | 2/2003 | Shinomiya |

OTHER PUBLICATIONS

Sapuntzakis, et al., "Optimizing the Migration of Virtual Computers," Proceedings of the Fifth Symposium on Operating Systems Design and Implementation, Dec. 2002, 14 pages.

Helfrich, et al., "Internet Suspend/Resume," ISR Project Home Page, 2003, 4 pages.

Kozuch, et al., "Internet Suspend/Resume," IRP–TR–02–01, Apr. 2002, Accepted to the Fourth IEEE Workshop on Mobile Computing Systems and Applications, Callicoon, NY, Jun. 2002, Intel Research, 9 pages.

Kozuch, et al., "Efficient State Transfer for Internet Suspend/Resume," IRP–TR–02–03, May 2002, Intel Research, 13 pages.

Tolia, et al., "Using Content Addressing to Transfer Virtual Machine State," IRP–TR–02–11, Summer 2002, Intel Research, 11 pages.

(List continued on next page.)

Primary Examiner—Kevin L. Ellis
(74) Attorney, Agent, or Firm—Lawrence J. Merkel; Meyertons, Hood, Kivlin, Kowert & Goetzel, P.C.

(57) ABSTRACT

A storage management system may provide virtual storage devices for use by an operating system. The storage management system may map files representing the virtual storage devices to a plurality of volumes to be stored on physical storage devices. In various embodiments, the storage management system may include storage management components which manage the files representing the virtual storage devices. In one implementation, the storage management system may support a set of storage commands for the virtual storage devices, including standard commands used by the operating system to communicate with storage devices, and additional commands for communicating with the storage management components. The storage management system may be configured to schedule various applications/operating systems for execution on multiple processing hardware, and to present a consistent view of storage for a given application/operating system, independent of which of the multiple processing hardware on which the application/operation system is executing.

28 Claims, 5 Drawing Sheets

OTHER PUBLICATIONS

Flinn, et al., "Data Staging on Untrusted Surrogates," IRP–TR–03–03, Mar. 2003, Intel Research, To Appear in the Proceedings of the $2^{nd}$ USENIX Conference on File and Storage Technologies, San Francisco, 16 pages.

Tolia, et al., "Opportunistic Use of Content Addressable Storage for Distributed File Systems," IRP–TR–03–02, Jun. 2003, Intel Research, To Appear in the Proceedings of the 2003 USENIX Annual Technical Conference, San Antonio, TX, 16 pages.

VMware, Inc., "VMware Control Center," 2003, 3 pages.

InfoWorld, Robert McMillan, "VMware Launches VMware Control Center," 2003, 2 pages.

VMware, Inc., "VMware Control Center: Enterprise–class Software to Manage and Control Your Virtual Machines," 2003, 2 pages.

John Abbott, Enterprise Software, "VMware Heads Toward Utility Computing With New Dynamic Management Tools," Jul. 1, 2003, 4 pages.

Dejan S. Milogicic, et al., "Process Migration," Aug. 10, 1999, 49 pages.

Xian–He Sun, et al., "A Coordinated Approach for Process Migration in Heterogeneous Environments," 1999, 12 pages.

Kasidit Chanchio, et al., "Data Collection and Restoration for Heterogeneous Process Migration," 1997, 6 pages.

Kasidit Chanchio, et al., "A Protocol Design of Communication State Transfer for Distributed Computing," Publication date unknown, 4 pages.

SourceForge™,"Project: openMosix: Document Manager: Display Document," 14 pages.

OpenMosix, "The openMosix HowTo: Live free() or die ()," May 7, 2003, 3 pages.

OpenMosix, "openMosix Documentation Wiki—don't," May 7, 2003, 2 pages.

Veritas, "Executive Overview," Technical Overview, pp. 1–9.

Kinshuk Govil, et al., "Cellular Disco: Resource Management Using Virtual Clusters on Shared–Memory Multiprocessors," $17^{th}$ ACM Symposium on Operating Systems Principles (SOSP'99), Published as Operating Systems Review 34(5):154–169, Dec. 1999, pp. 154–169.

Edouard Bugnion, et al:, "Disco: Running Commodity Operating Systems on Scalable Multiprocessors," Computer Systems Laboratory, Stanford, CA, 33 pages.

"White Paper, GSX Server," VMware, Inc., Dec. 2000, pp. 1–9.

"Vmware GSX Serve, The Server Consolidation Solution," VMware, Inc., 2001, 2 pages.

"Manage Multiple Worlds., From Any Desktop," VMware, Inc., 2000, 2 pages.

"VMware ESX Server, The Server Consolidation Solution for High–Performance Environments," VMware, Inc., 2001, 2 pages.

Melinda Varian, "VM and the VM Community: Past, Present, and Future," Operating Systems, Computing and Information Technology, Princeton Univ., Aug. 1997, pp. 1–67.

VERITAS, "Comparison: Microsoft Logical Disk Manager and VERITAS Volume Manager for Windows," May 2001, 4 pages.

VERITAS, "How VERITAS Volume Manager Complements Hardware RAID in Microsoft Server Environments," May 2001, pp. 1–7.

VERITAS, "VERITAS Volume Manager for Windows, Best Practices," May 2001, pp. 1–7.

Barrie Sosinsky, Ph.D., "The Business Value of Virtual Volume Management, In Microsoft Window NT and Windows 2000 Netowrks," VERITAS, A white paper for administrators and planners, Oct. 2001, pp. 1–12.

VERITAS, "VERITAS Volume Manager for Windows NT," Version 27, 2001, 4 pages.

"BladeFram™ System Overview," Egenera, Inc., 2001, 2 pages.

White Paper, "The Egenera™ Processing Area Network (PAN) Architecture," Egenera, Inc., 2002, 20 pages.

White Paper, "Emerging Server Architectures," Egenera, Inc., 2001, 12 pages.

White Paper, "Improving Data Center Performance," Egenera, Inc., 2001, 19 pages.

White Paper, "Guidelines for Effective E–Business Infrastructure Management," Egenera, Inc., 2001, 11 pages.

White Paper, "The Pros and Cons of Server Clustering in the ASP Environment," Egenera, Inc., 2001, 10 pages.

Position Paper, "Taking Control of the Data Center," Egenera, Inc., 2001, 4 pages.

Position Paper, "The Linux Operating System: How Open Source Software Makes Better Hardware," Egenera, Inc., 2001, 2 pages.

"Solution Overview," TrueSAN Networks, Inc., 2002, 7 pages.

"Simics: A Full System Simulation Platform," Reprinted with permission from Computer, Feb. 2002, © The Institute of Electrical and Electronics Engineering, Inc., pp. 50–58.

"Introduction to Simics Full–System Simulator without Equal," Virtutech, Jul. 8, 2002, 29 pages.

"The Technology of Virtual Machines," A Conneectix White Paper, Connectix Corp., 2001, 13 pages.

"The Technology of Virtual PC," A Conneectix White Paper, Connectix Corp., 2000, 12 pages.

"About LindowsOS," Lindows.com, http://www.lindows.com/lindows_products_lindowsos.php, 2002, 2 pages.

"Savannah: This is a Savannah Admin Documentation," Savannah, Free Software Foundation, Inc.© 2000–2002, 31 pages.

"Virtuozzo Basics," Virtuozzo, http://www.sw–soft.com/en/products/virtuozzo/basics/, © 1994–2002 SWsoft, printed from web on Dec. 13, 2002, 2 pages.

"What is Virtual Environment(VE)?," SWsoft, http://www.sw–soft/en/products/virtuozzo/we/, © 1994–2002 SWsoft, printed from web on Dec. 13, 2002, 2 pages.

"Products," Netraverse, Inc, 2002, http://www.netraverse.com/products/index.php, printed from web on Dec. 13, 2002, 1 page.

"NeTraverse Win4Lin 4.0—Workstation Edition," Netraverse, Inc, 2002, http://www.netraverse.com/products/win4lin40/, printed from web on Dec. 13, 2002, 1 page.

"Win4Lin Desktop 4.0," Netraverse, Inc, 2002, http://www.netraverse.com/products/win4lin40/benefits.php, printed from web on Dec. 13, 2002, 1 page.

"Win4Lin Desktop 4.0," Netraverse, Inc, 2002, http://www.netraverse.com/ products/win4lin40/features.php, printed from web on Dec. 13, 2002, 2 page.

"Win4Lin Desktop 4.0," Netraverse, Inc, 2002, http://www.netraverse.com/products/win4lin40/requirements.php, printed from web on Dec. 13, 2002, 2 page.

"Win4Lin Terminal Server 2.0," Netraverse, Inc, 2002, http://www.netraverse.com/ products/wts, printed from web on Dec. 13, 2002, 1 page.

"Win4Lin Terminal Server 2.0," Netraverse, Inc, 2002, http://www.netraverse.com/ products/wts/benefits.php, printed from web on Dec. 13, 2002, 1 page.

Win4Lin Terminal Server 2.0, Netraverse, Inc, 2002, http://www.netraverse.com/ products/wts/features.php, printed from web on Dec. 13, 2002, 2 pages.

Win4Lin Terminal Server 2.0, Netraverse, Inc, 2002, http://www.netraverse.com/ products/wts/requirements.php, printed from web on Dec. 13, 2002, 2 pages.

Win4Lin Terminal Server 2.0, Netraverse, Inc, 2002, http://www.netraverse.com/ products/wts/technology.php, printed from web on Dec. 13, 2002, 1 page.

Win4Lin, Netraverse, Inc, 2002, http://www.netraverse.com/ support/docs/Win4Lin–whitepapers.php, printed from web on Dec. 13, 2002, 5 pages.

"Virtual PC for Windows," Connectix, Version 5.0, 2002, 2 pages.

Dave Gardner, et al., "WINE FAQ,", © David Gardner 1995–1998, printed from www.winehq.org, 13 pages.

"Winelib User's Guide," Winelib, www.winehq.org, 26 pages.

John R. Sheets, et al, "Wine Users Guide," www.winehq.org, pp. 1–53.

"Wine Developer's Guide," pp. www.winehq.org, 1–104.

* cited by examiner-

STORAGE MANAGEMENT SYSTEM

BACKGROUND OF THE INVENTION

1. Field of the Invention

This invention is related to the field of storage management and, more particularly, to software used in storage management.

2. Description of the Related Art

Computer systems typically include storage devices (or are coupled to access storage devices through, e.g., a network) for storing the software to be executed on the computer system, the data to be operated on by the software, and/or the data resulting from the execution of the software by the computer system. Growth continues in the amount of storage that is included in computer systems or to which computer systems have access. Additionally, different types of storage (e.g. network attached storage (NAS), storage area networks (SAN), etc.) continue to be developed and expanded.

In order to manage the use and operation of the storage devices, various storage management software has been developed. For example, file system software, volume managers, volume replicators, etc. have been developed to help effectively manage storage devices. Typically, such storage management software includes one or more modules of code that are included "inside" the operating system (executing with operating system privileges and/or interfacing closely with other operating system code). Thus, such storage management software requires the support of, or at least the permission of, the operating system vendors who make the operating systems for the computer systems on which the storage management software is to execute.

In many cases, the storage management software may be made available on several different operating system platforms. In these cases, different versions of the software must be maintained for each different operating system. Additionally, each time a given operating system changes, the corresponding version often must be modified and retested (and in some cases, recertified by the operating system vendor).

In the case of open source operating systems (e.g. Linux), the module that is incorporated in the operating system (and sometimes other parts of the storage management software) must be open-sourced for inclusion in the operating system. Thus, at least a portion of the storage management software becomes publicly available.

In the extreme, the operating system vendor may drop support/permission with regard to subsequently developed versions of the operating system. Additionally, the module may have to make use of unpublished application programming interfaces (APIs), which may be changed more freely and/or more often by the operation system vendor (and thus may require more frequent changes to the module and/or the storage management software as a whole).

SUMMARY OF THE INVENTION

A storage management system is provided. In one embodiment, the storage management system is configured to provide one or more virtual storage devices for use by an operating system. The storage management system is configured to map files representing the virtual storage devices to a plurality of volumes to be stored on physical storage devices. In various embodiments, the storage management system may include storage management components (e.g. a file system, a volume manager, a volume replicator, or a hierarchical storage manager) which manage the files representing the virtual storage devices.

In one implementation, a storage management system may include one or more storage management components and may be configured to provide one or more virtual storage devices for use by the operating system. The storage management system may support a set of storage commands for the virtual storage devices. The set of storage commands may include: (i) a set of standard commands used by the operating system to communicate with storage devices, and (ii) one or more additional commands for communicating with the storage management components.

In another embodiment, a storage management system may be configured to schedule various applications/operating systems for execution on multiple processing hardware. The storage management system may be configured to present a consistent view of storage for a given application/operating system, independent of which of the multiple processing hardware on which the application/operation system is executing. In some embodiments, the application/operating system may be executing within a complete virtual machine.

BRIEF DESCRIPTION OF THE DRAWINGS

The following detailed description makes reference to the accompanying drawings, which are now briefly described.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

Figure 1:
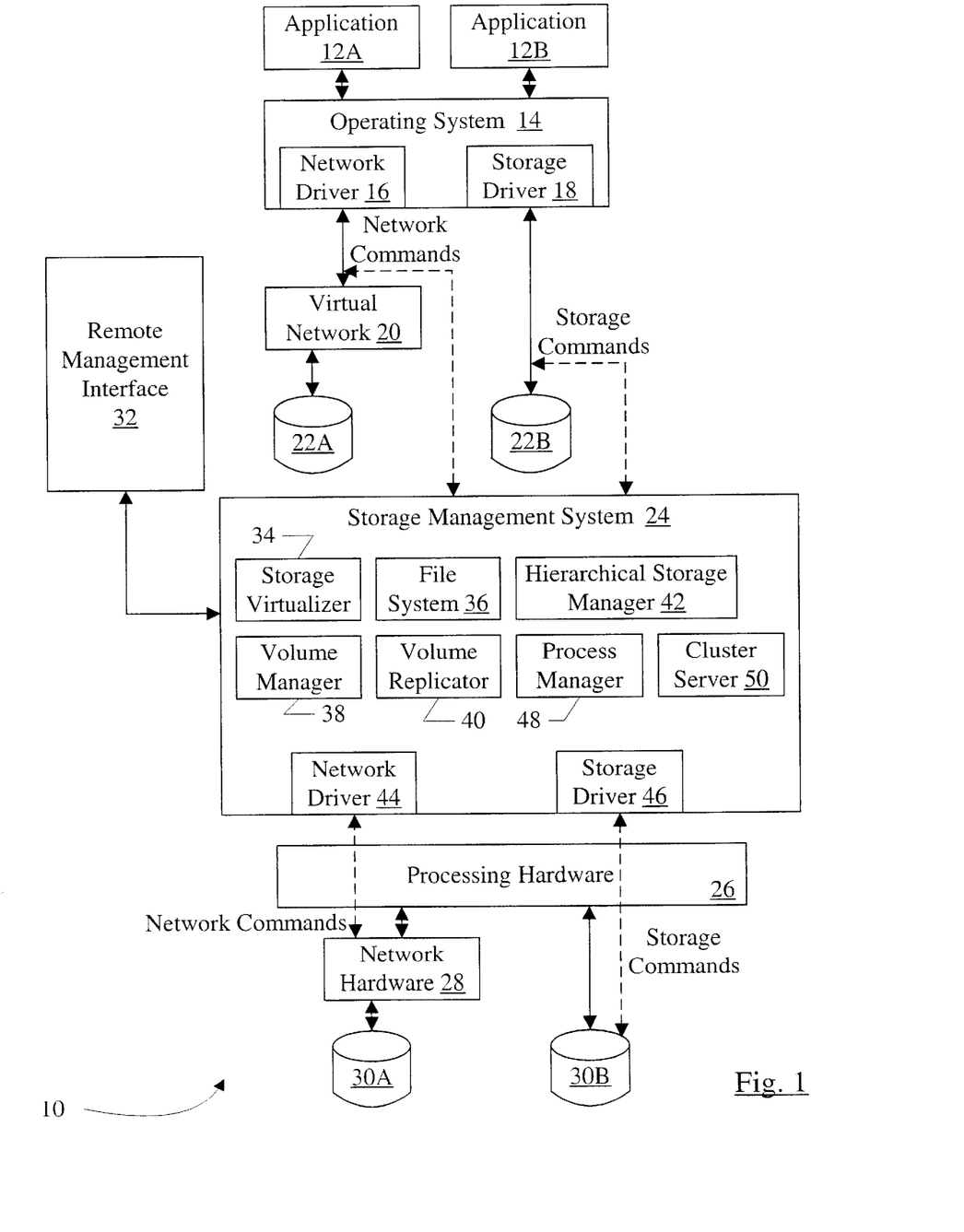
FIG. 1 is a block diagram of one embodiment of a computing system including a storage management system.

Turning now to FIG. 1, a block diagram of one embodiment of a computing system 10 is shown. Other embodiments are possible and contemplated. In the illustrated embodiment, the computing system 10 includes one or more applications (e.g. applications 12A and 12B in FIG. 1) which execute on an operating system 14, one or more virtual networks (e.g. virtual network 20 in FIG. 1), one or more virtual storage devices (e.g. virtual storage devices 22A–22B in FIG. 1), a storage management system 24, processing hardware 26, network hardware 28, and one or more physical storage devices (e.g. physical storage devices 30A–30B in FIG. 1). The computing system 10 may also include a remote management interface 32. The processing hardware 26 is coupled to the network hardware 28 and the storage device 30B. The network hardware 28 is further coupled to the storage device 30A via a network. The operating system 14 includes a network driver 16 and a storage driver 18.

The storage management system 24 is a software layer which operates between the operating system 14 and the physical hardware (e.g. the processing hardware 26, the network hardware 28, and the physical storage devices 30A–30B). The storage management system 24 provides a set of virtual storage devices 22A–22B (and a virtual network 20, in this embodiment) for use by the operating system 14. For example, when the computing system 10 is started, the storage management system 24 may be started first, and then the operating system 14 may be started. During start up, the operating system 14 may attempt to locate the storage devices and other I/O devices in the computer system on which the operating system 14 is executing. The storage management system 24 may respond to these attempts by indicating that one or more storage devices and/or network hardware devices are in the computer system. The storage devices and/or network devices are virtual (the virtual network 20 and the virtual storage devices 22A–22B). That is, the virtual devices are not actual hardware, but are logical software constructs created by the storage management system 24. From the point of view of the operating system 14, the devices appear to be physical devices with which the operating system 14 can interact, but in actuality the storage management system 24 may respond to commands from the operating system 14.

More particularly, in the embodiment of FIG. 1, the operating system 14 includes a network driver 16 and a storage driver 18. Generally, driver software comprises instructions coded to interact with the corresponding hardware. The driver software may be coded to generate commands to the hardware, read and write hardware facilities (e.g. configuration/control registers), service interrupts generated by the hardware, etc. Often, driver software varies from manufacturer to manufacturer of the hardware device with which the driver software communicates (e.g. the network driver 16 may differ depending on the manufacturer of the network hardware with which the network driver 16 communicates). Similarly, the storage driver 18 comprises instructions coded to interact with a particular storage device (e.g. a particular manufacturer or type of storage device).

Thus, in the embodiment of FIG. 1, the storage management system 24 indicates a "manufacturer"/type of the virtual network 20 and the virtual storage devices 22A–22B, and the operating system 14 uses the corresponding driver software to interact with the virtual network 20 and the virtual storage devices 22A–22B via the storage management system 24. For example, it may be desirable to indicate that older storage devices/network hardware is included, so that the corresponding driver software may be less susceptible to bugs (since the driver software has been in existence for some time). As another example, it may be desirable to provide a basic storage device/network hardware (e.g. a storage device/network hardware that supports the basic features of the device but which does not include many proprietary features or advanced features that tend to be developed over time and may differ significantly from device to device). In this manner, the virtual storage devices/network devices may be relatively simple to emulate.

In one embodiment, the storage management system 24 may implement the virtual storage devices as small computer systems interface (SCSI) devices. Thus, in such an embodiment, the storage commands may include standard SCSI commands (e.g. as defined in SCSI-1, SCSI-2, and/or SCSI-3 standards). Other embodiments may employ other standard storage device types. In one embodiment, the storage management system 24 may implement the virtual network as an Ethernet network interface controller (NIC). Other embodiments may implement other network interface controllers. The virtual storage devices which couple via the virtual network 20 (e.g. the virtual storage device 22A in FIG. 1) may be virtual NAS or virtual SAN devices, in some embodiments. In other words, the operating system 14 may communicate with one or more virtual storage devices through the virtual network 20.

The network driver 16 is coded to interact with the network hardware represented by the virtual network 20. That is, the network driver 16 is configured to generate network commands to the network hardware in response to higher level software in the operating system 14. Similarly, the storage driver 18 is coded to interact with the storage device represented by the virtual storage device 22B. That is, the storage driver 18 is configured to generate storage commands to the storage device 22B. In a typical computer system, the network commands and storage commands would be driven out of the processor on which the operating system 14 is executing and would be routed by the computer system hardware to the network hardware or storage device, respectively (e.g. over various interconnect within the computer system such as peripheral buses).

In the illustrated embodiment, by contrast, the network commands and storage commands are received by the storage management system 24 (which provides the virtual network 20 and the virtual storage devices 22A–22B for use by the operating system 14), illustrated in FIG. 1 via the dotted lines from the command paths to the storage management system 24. The storage management system 24 manages the virtual storage devices and responds to the commands similar to the fashion in which the corresponding physical network hardware or physical storage device would respond. For example, if the storage driver 18 transmits a read command, the storage management system 24 returns the block (or blocks) addressed by the read. If the storage driver 18 transmits a write command, the storage management system 24 updates the block (or blocks) addressed by the write with the data provided in the write command. If the storage driver 18 transmits a control command, the storage management system 24 responds according to the defined operation of the corresponding physical storage device for that control command.

The network driver 16 and the storage driver 18 generate the network commands and storage commands, respectively, while executing on the underlying processing hardware 26. The processing hardware 26 may include one or more processors, and one of the processors may be executing the network driver 16 or storage driver 18 when a command is generated. The executing processor may trap the network commands and storage commands to the storage management system 24, prior to the commands being transmitted out of the executing processor to other hardware within the processing hardware 26. For example, in one embodiment, the executing processor may support various privilege levels at which software may execute. The storage commands and network commands may be generated by instructions which require the higher privilege levels (the "more privileged" privilege levels) to execute. The storage management system 24 may force the operating system 14 (including the drivers 16 and 18) and the applications 12A–12B to executed at a privilege level which is insufficiently privileged to perform the commands. Thus, when the instructions to generate the commands are encountered, the executing processor may trap. The storage management system 24 may begin execution in response to the trap, and may thus capture the network commands/storage commands. Other mechanisms for trapping the commands may be used in other embodiments.

In one embodiment, the storage management system 24 maps each virtual storage device 22A–22B to one or more files to be stored on the physical storage devices 30A–30B in the computing system 10. The physical storage devices 30A–30B need not be the same type as the virtual storage devices 22A–22B. For example, in one embodiment, each virtual storage device may map to a file or files representing the state of the virtual storage device (e.g. the file or files may be a series of blocks corresponding to the blocks stored on the virtual storage device). Additionally, if desired, writes may be accumulated in a copy-on-write file so that the writes may be discarded if it is later determined that the writes are not to be committed to the persistent state of the virtual storage device. In other cases, the writes may be committed directly to the file representing the state of the virtual storage device. The storage management system 24 may generate storage commands and/or network commands (when executing on the processing hardware 26) to the network hardware 28 and the physical storage devices 30A–30B to access/update the files in response to commands generated by the operating system 14 (or more particularly the driver software 16 and 18). Additionally, as described in more detail below, the storage management system 24 may generate commands in response to the operation of various storage management components within the storage management system 24 or in response to input from the remote management interface 32.

As illustrated in FIG. 1, the storage management system 24 may include a network driver 44 for communicating with the network hardware 28 and a storage driver 46 for communicating with the physical storage device 30B. Thus, the vendors which manufacture the network hardware 28 and the physical storage devices such as physical storage device 30B may supply driver software which is coded to operate in the storage management system 24. The storage management system 24 may support a variety of different operating systems 14, in some embodiments, and thus the vendors may be able to support multiple operating systems with a single driver used in the storage management system 24. Changes in the operating system software may not affect the operation of the driver 44 and 46, and thus the number of changes to the driver software 44 and 46 may be fewer (e.g. changes may be made when the storage management system 24 is changes, but not when various operating systems 14 change). Furthermore, support and/or permission of the operating system vendors may not be required, since the driver software 44 and 46 executes within the storage management system 24 instead of the operating system 14. Thus, the driver software 44 and 46 need not be opensourced, in one embodiment, (even if the operating system 14 is open source); free versions need not be negotiated, in one embodiment, with the operating system vendors; and unpublished APIs of the operating system 14 need not be used, in one embodiment.

The storage management system 24 may include a set of software components to perform various functions included in the storage management system 24. For example, the embodiment of the storage management system 24 shown in FIG. 1 includes a storage virtualizer 34. The storage virtualizer 34 may be the component which provides the virtual network 20 and the virtual storage devices 22A–22B, processing the network commands and/or storage commands received from the operating system 14 and mapping the state of the virtual storage devices 22A–22B to files. The storage management system 24 may further include a variety of storage management components for managing the virtual storage device files. As used herein, a storage management component is any software component which is used to manage storage. For example, in FIG. 1, the storage management system may include a file system 36, a volume manager 38, a volume replicator 40, and a hierarchical storage manager 42. Other embodiments may include any subset of the above examples of storage management components, or subsets or supersets of the above storage management components and other storage management components not shown in FIG. 1.

The file system 36 may provide a organizational structure for the files (e.g. allowing the files to be arranged in a hierarchy of directories) and may map each file to a volume based on the position of the file in the organizational structure, the desired attributes of the file (e.g. speed of storage on which the file is stored, whether or not the file is to have failure protection mechanisms applied such as redundant array of independent disks (RAID), what failure protection mechanisms to use (e.g. what RAID level to use), etc.), etc. Additionally, the file system 36 may provide backup and recovery mechanisms (e.g. journaling of file updates), mechanisms to reduce the fragmentation of files among noncontiguous blocks on the underlying storage device, etc. An exemplary file system which may be used in one implementation is the VERITAS File System™ available from VERITAS™ Software Corporation (Mountain View, Calif.).

Generally, volumes may be used to abstract the organizational structure of the file system 36 from the storage of data on the physical storage devices 30A–30B. A "volume" is a defined amount of storage space. The size of the volume may be modified via specific commands to the volume manager 38, but otherwise may remain fixed during operation. A volume may be mapped to storage on one physical storage device 30A–30B, or may be spread across multiple physical storage devices, as desired. Each volume may have a set of volume attributes, which may control the type of storage on which the volume is stored, the RAID level used, etc.

The volume manager 38 manages the storage of the volumes on the physical storage devices 30A–30B, based on the volume attributes and the available storage. The volume manager 38 may change the size of volumes, and may move volumes from physical storage device to physical storage device in response to changes to the volume attributes or changes requested via the remote management interface 32 or other software. Additionally, the volume manager 38 may implement the desired RAID level (if used) in software by managing the mapping of volumes to physical storage devices 30A–30B (e.g. striping, mirroring, generating parity, etc.). The volume manager 38 may further be configured to monitor performance of the storage system and change volume configuration to improve the performance of the storage system. An exemplary volume manager that may be used in one implementation is the VERITAS Volume Manager™ available from VERITAS™ Software Corporation. Additionally, the volume replicator 40 may replicate a given volume to one or more remote physical storage devices (not shown in FIG. 1) to provide additional disaster recovery protection. A physical storage device may be viewed as "remote" if it is geographically distant from the computing system 10, as compared to the storage devices 30A–30B. Alternatively, the volume replicator 40 may replicate a given volume to one or more local physical storage devices, or a combination of remote and local storage devices. An exemplary volume manager that may be used in one implementation is the VERITAS Volume Replicator™ available from VERITAS™ Software Corporation.

The hierarchical storage manager 42 may attempt to move files which are infrequently accessed from more expensive (usually faster) storage devices to less expensive (usually slower) storage devices. The hierarchical storage manager 42 may monitor access to the various files in the file system, and if a given file has not been accessed for a defined period of time, may move the file to another storage device. The hierarchical storage manager 42 may retain information in the original file location to locate the moved file. Thus, in the event that the file is accessed, the hierarchical storage manager 42 may automatically retrieve the file and return it to the more expensive storage. The hierarchical storage manager 42 may move the file to a different volume which has volume attributes mapping the volume to a slower storage device, for example. An exemplary volume manager that may be used in one implementation is the VERITAS Netbackup Storage Migrator™ available from VERITAS™ Software Corporation.

The storage management components may not, in some embodiments, require the support/permission of the operating system vendors for their products. A single version of the storage management component (for the storage management system 24) may be used to support multiple operating system platforms. Additionally, the storage management components need not be open-sourced, in one embodiment. Free versions of the storage management components need not be negotiated with the operating system vendors, in one embodiment. Unpublished APIs of the operating system 14, in one embodiment, need not be used by the storage management components.

In one implementation, the operating system 14 may execute unmodified on the computing system 10 (unmodified as compared to versions which execute on computing systems which do not include the storage management system 24). The operating system 14 uses the virtual network 20 and the virtual storage devices 22A–22B in the same fashion as the corresponding physical devices are used. The operating system 14 executes without any recognition that the storage management system 24 is in the computing system 10. However, in some cases, it may be desirable to have an application 12A–12B which is "aware" of the storage management system 24. For example, a backup program may execute as an application, and it may be desirable for the backup program to communicate with one or more of the storage management components to perform the backup. Similarly, if the operating system 14 were subsequently modified to be "aware" of the storage management system 24, it may be desirable for the operating system 14 to be able to communicate with the storage management components.

As mentioned above, the storage commands transmitted by the storage driver 18 to the virtual storage devices may include the standard storage commands according to the type of virtual storage device (e.g. SCSI commands). The storage management system 24 may also support additional storage commands besides the standard storage commands. The additional storage commands may be used to communicate with the storage management components. The additional storage commands, as a group, may form an expanded API for the virtual storage device. For example, if the standard storage commands are SCSI commands, additional input/output control (IOCTL) commands may be defined to communicate with the storage management components. In other words, some encodings of the IOCTL commands for the standard SCSI interface are not defined. These encodings may be defined to be various commands to the storage management components.

Any set of additional commands may be defined, depending on the storage management components included in the storage management system. For example, commands may include a create new disk command to create a new virtual storage device, a create snapshot of disk command to create a copy of a virtual storage device at a given point in time, a set RAID level command to change the RAID level used for a volume containing a virtual storage device, a start replication command to cause a volume storing a virtual storage device to be replicated, a move disk command to move a volume storing a virtual storage device to a different physical storage device, etc.

The processing hardware 26 includes at least one processor, and may include multiple processors in a multiprocessing configuration. The processing hardware 26 may also include additional circuitry (e.g. a memory controller and memory, peripheral bus controllers, etc.) as desired. The processing hardware 26 may be a single blade for a blade server (in which each blade includes processors and memory). In other computing systems, multiple blades may be used (e.g. FIG. 4).

The network hardware 28 may comprise any hardware for coupling the processing hardware 26 to a network. For example, the network hardware 28 may comprise a network interface controller for an Ethernet network. Alternatively, the network hardware 28 may interface to a token ring network, a fibre channel interface, etc.

The physical storage devices 30A–30B may be any type of device capable of storing data. For example, physical storage devices may comprise SCSI drives, integrated drive electronics (IDE) drives, drives connected via various external interfaces (e.g. universal serial bus, firewire (IEEE 1394), etc.), tape drives, compact disc read-only-memory (CD-ROM), CD recordable (CD-R), CD read/write (CD-RW), digital versatile disk (DVD), etc. The physical storage devices 30A–30B may be coupled to the processing hardware via a peripheral interface (e.g. physical storage device 30B) or via a network (e.g. NAS or SAN technologies, illustrated in FIG. 1 as physical storage device 30A).

The operating system 14 may be any operating system, such as any of the Microsoft™ Windows™ operating systems, any Unix variant (e.g. HP-UX, IBM AIX, Sun Solaris, Linux, etc.), or any other operating system.

It is noted that, while virtual and physical network hardware is shown in FIG. 1, the virtual and/or physical network hardware is optional and may not be included in other embodiments.

While in the above description, the storage management system provides virtual I/O devices for the operating system 14 to use, other embodiments may employ additional functionality. For example, in one embodiment, the storage management system 24 may also include a process manager 48 for scheduling various portions of the storage management system 24, the operating system 14, and the applications 12A–12B for execution on the processing hardware 26. In other embodiments, the storage management system may employ a full virtual machine in which the operating system 14 and applications 12A–12B may execute. Generally, a virtual machine comprises any combination of software, one or more data structures in memory, and/or one or more files stored on various physical storage devices. The virtual machine mimics the hardware used during execution of a given application and/or operating system. For example, the applications 12A–12B are designed to execute within the operating system 14, and both the applications 12A–12B and the operating system 14 are coded with instructions executed by a virtual CPU in the virtual machine. The applications 12A–12B and/or the operating system 14 may make use of various virtual storage and virtual I/O devices (including the virtual network 20, the virtual storage devices 22A–22B, and other virtual I/O devices (not shown) such as modems, audio devices, video devices, universal serial bus (USB) ports, firewire (IEEE 1394) ports, serial ports, parallel ports, etc.).

The virtual machine in which an application/operating system is executing encompasses the entire system state associated with an application. Generally, when a virtual machine is active (i.e. the application/operating system within the virtual machine is executing), the virtual machine may be stored in the memory of the computing system on which the virtual machine is executing and in the files on the physical storage devices. The virtual machines may be suspended, in which an image of the virtual machine is written to a physical storage device, thus capturing the current state of the executing application. The image may include one or more files written in response to the suspend command, capturing the state of the virtual machine that was in memory in the computing system, as well as the files stored on the physical storage devices 30A–30B that represent the virtual storage devices included in the virtual machine. The state may include not only files written by the application, but uncommitted changes to files which may still be in the memory within the virtual machine, the state of the hardware (including the virtual CPU, the memory in the virtual machine, etc.) within the virtual machine, etc. Thus, the image may be a snapshot of the state of the executing application.

A suspended virtual machine may be resumed. In response to the resume command, the storage management system may read the image of the suspended virtual machine from disk and may activate the virtual machine in the computer system.

In one embodiment, the storage virtualizer may be part of the virtual machine software. Any virtual machine software may be used. For example, in one implementation, the ESX server™ product available from VMWare, Inc. (Palo Alto, Calif.) or the GSX server™ product available from VMWare, Inc. may be used.

In some embodiments, the storage management system 24 may further include cluster server software 50 to allow the computing system 10 to be clustered with other computing systems to allow the fail over of an application 12A–12B if a failure occurs on the computing system 10. Generally, the cluster server 50 may monitor each application and the resources it needs (e.g. operating system services, hardware in the computing system 10, etc.) for execution to detect a failure. In embodiments including full virtual machines, the entire virtual machine may be failed over. In still other embodiments, an application may be failed other rather than a virtual machine. For example, the application may be preprocessed to provide information used in the failover (e.g. the Instant Application Switching technology from Ejasent, Inc. (Mountain View, Calif.) may be used to fail over applications).

The remote management interface 32 may be used to directly interface to the storage management system 24. For example, a system administrator responsible for the computing system 10 may use the remote management interface 32 to communicate with the storage management components to reconfigure the physical storage devices 30A–30B for the computing system 10 while keeping the virtual storage unchanged relative to the operating system 14. In embodiments employing virtual machines, the remote management interface 32 may execute in a separate virtual machine from the operating system 14 and the applications 12A–12B.

Figure 2:
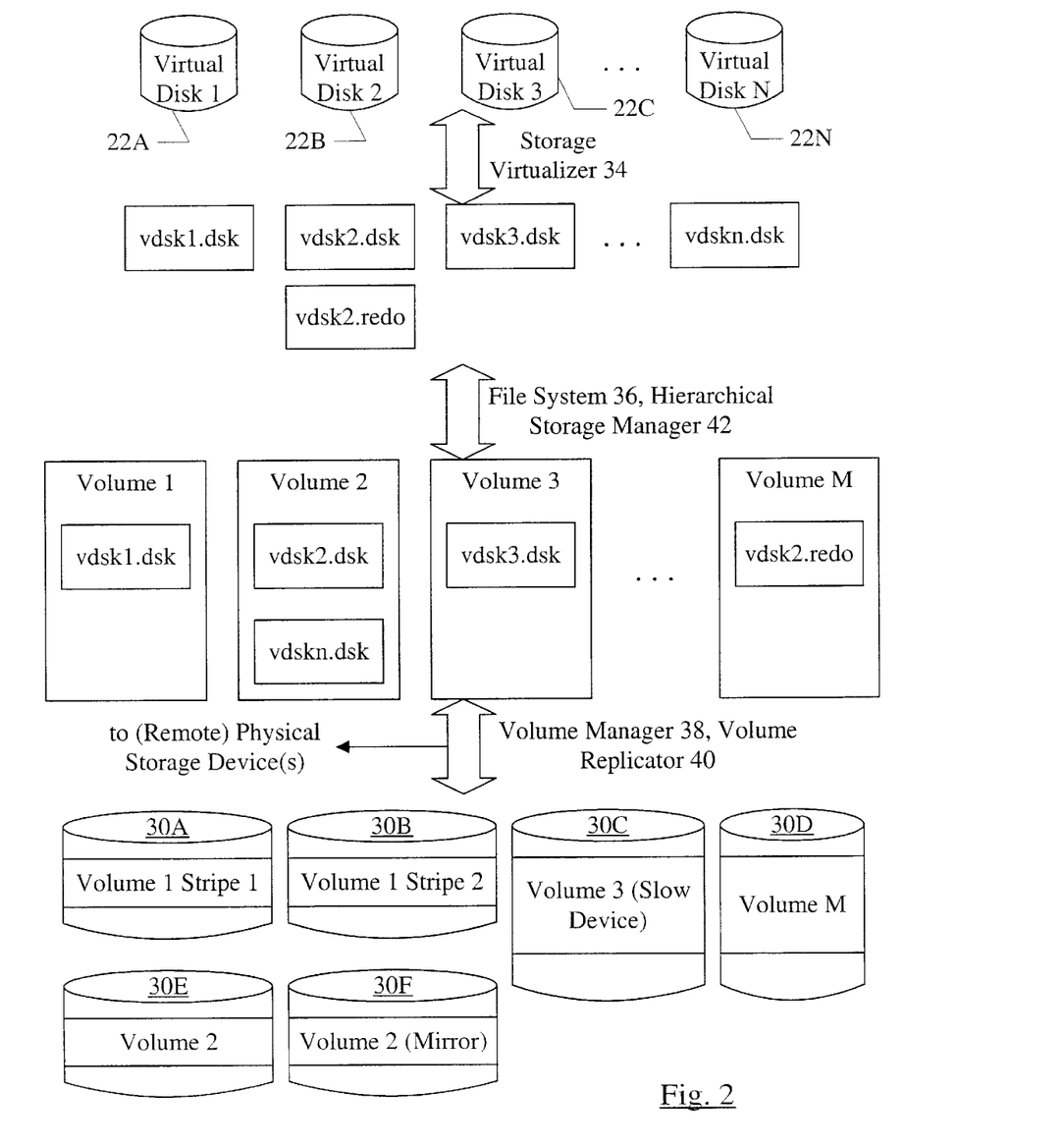
FIG. 2 is a hierarchical diagram illustrating one embodiment of virtual storage devices and a mapping to physical storage devices using one or more storage management components.

Turning next to FIG. 2, a hierarchical diagram illustrating one embodiment of virtual storage devices and a mapping to physical storage devices using one or more storage management components is shown. Other embodiments are possible and contemplated.

In FIG. 2, several virtual storage devices (virtual disks 22A–22N) are shown. The storage virtualizer 34 maps each virtual disk 22A–22N to at least one file. More particularly, the virtual disk 22A is mapped to a file labeled vdsk1.dsk, which stores the data stored on the virtual disk 22A. The data may be arranged in the file in the same order as blocks on the virtual disk 22A (e.g. block 0, followed by block 1, followed by block 2, etc.). Similarly, the virtual disk 22C is mapped to a file labeled vdsk3.dsk and the virtual disk 22N is mapped to a file labeled vdskn.dsk. In FIG. 2, the virtual disk 22B is mapped to a file labeled vdsk2.dsk, which stores the data stored on the virtual disk 22B similar to the above discussion. Additionally, the file vdsk2.redo is provided for the virtual disk 22B. The vdsk2.redo file may be a copy on write file (e.g. the vdsk2.dsk file may represent the state of the virtual disk 22B at a point in time, and writes to the virtual disk 22B subsequent to that point in time are logged in the vdsk2.redo file). Thus, the virtual disk 22B is represented by two files in the embodiment of FIG. 2, while the other virtual disks 22A and 22C–22N are represented by one file.

The file system 36 maps the files corresponding to the virtual disks to a plurality of volumes (volume 1 through volume M in FIG. 2). The volume manager 38 maps the volumes to physical storage devices (e.g. physical storage devices 30A–30F in FIG. 2). Generally, any file may be mapped to any volume. Multiple files may be mapped to the same volume (e.g. vdsk2.dsk and vdskn.dsk are mapped to volume 2). The mapping may be based on the volume attributes assigned to each volume, in some cases.

For example, the volume manager 38 maps volume 1 as stripes to physical storage devices 30A and 30B. The virtual disk 22A is mapped to volume 1, and thus has striping characteristics (RAID level 0). On the other hand, the volume manager 38 maps volume 2 to the physical storage device 30E, and mirrors volume 2 on the physical storage device 30F (RAID level 1). Since vdsk2.dsk and vdskn.dsk are mapped to volume 2, these files have RAID level 1 characteristics. The volume manager maps volume 3 to a slower (and possibly less expensive) physical storage device 30C. The file vdsk3.dsk is mapped to volume 3. The hierarchical storage manager 42 may map the file vdsk3.dsk to volume 3 in response to determining that the file vdsk3.dsk has not been accessed for a long period of time. Alternatively, the file system 36 may map the file vdsk3.dsk to volume 3. Finally, volume M is mapped to the physical storage device 30D in this example.

Additionally, the volume replicator 40 may be operating to replicate one or more of the volumes 1 through M to one or more remote physical storage devices (not shown in FIG. 2). Alternatively, the volume replicator 40 may replicate a given volume to one or more local physical storage devices, or a combination of remote and local storage devices.

It is noted that, while mirroring and striping are illustrated in FIG. 2, generally the volume manager 38 may support any RAID levels or other failure protection and/or performance enhancing storage schemes.

Figure 3:
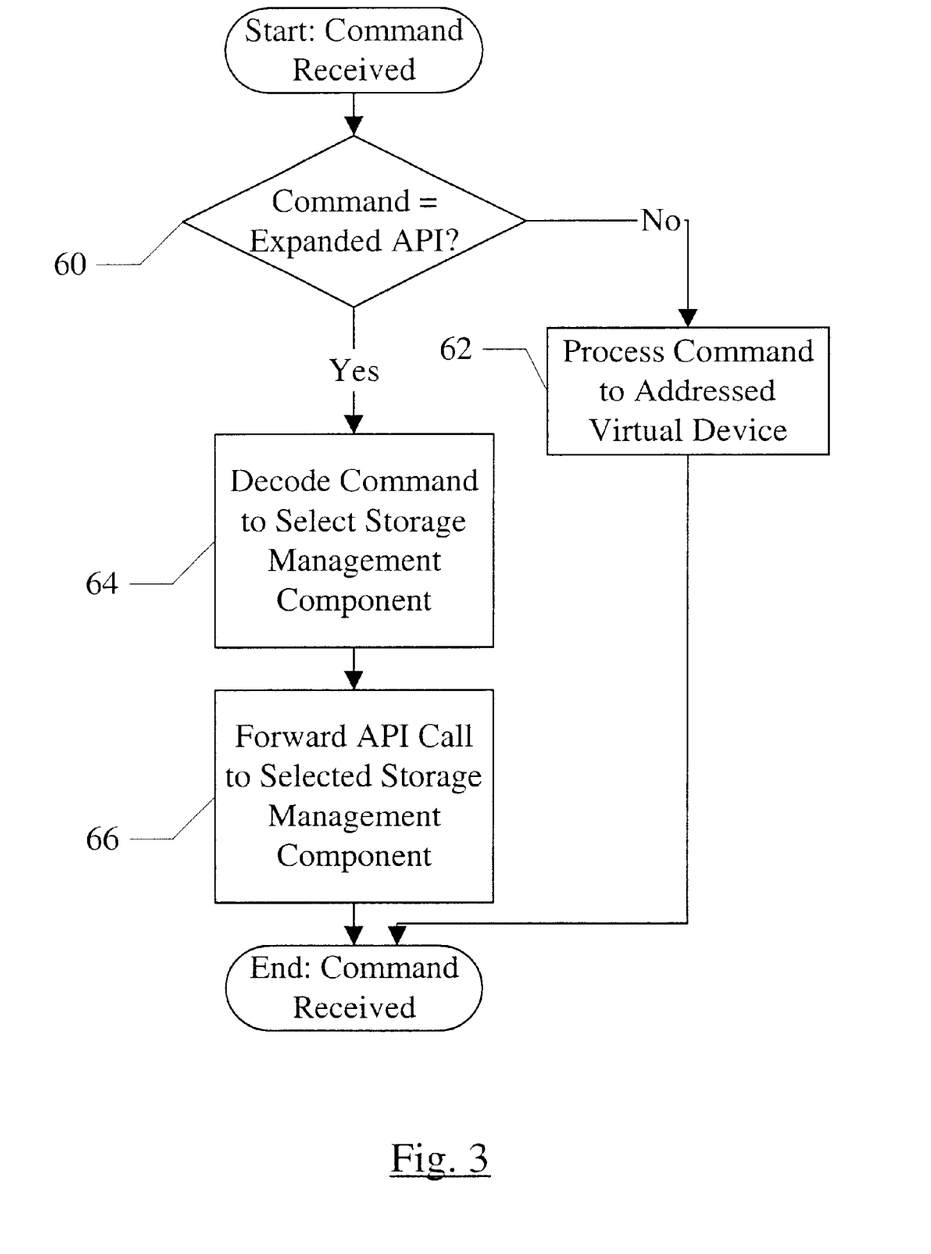
FIG. 3 is a flowchart illustrating one embodiment of the operation of the storage management system in response to receipt of a storage command to a virtual storage device by the storage management system.

Turning now to FIG. 3, a flowchart illustrating one embodiment of the operation of the storage management system 24 in response to receipt of a storage command to a virtual storage device is shown. Other embodiments are possible and contemplated. The operation illustrated in FIG. 3 may, in one embodiment, be performed by the storage virtualizer 34. In other embodiments, the operation may be performed by other software components comprising the storage management system 24.

The storage management system 24 decodes the storage command and determines if the storage command is part of the expanded API (decision block 60). If not, the storage management system 24 processes the standard storage command to the addressed virtual storage device (block 62). On the other hand, if the storage command is part of the expanded API, the storage management system 24 may further decode the storage command to select the storage management component to which the API call is to be directed (block 64). The storage command may also include one or more parameters for the API call. The storage management system 24 forwards an API call to the selected storage management component (block 66), which then processes the API call. It is noted that the storage commands, when generated by an application such as application 12A or 12B, may pass through the operating system 14 without the operating system 14 operating on the command itself. In other words, the operating system 14 (and particularly the storage driver 18) may transmit the storage command to the virtual storage device without operating on the command itself.

Figure 4:
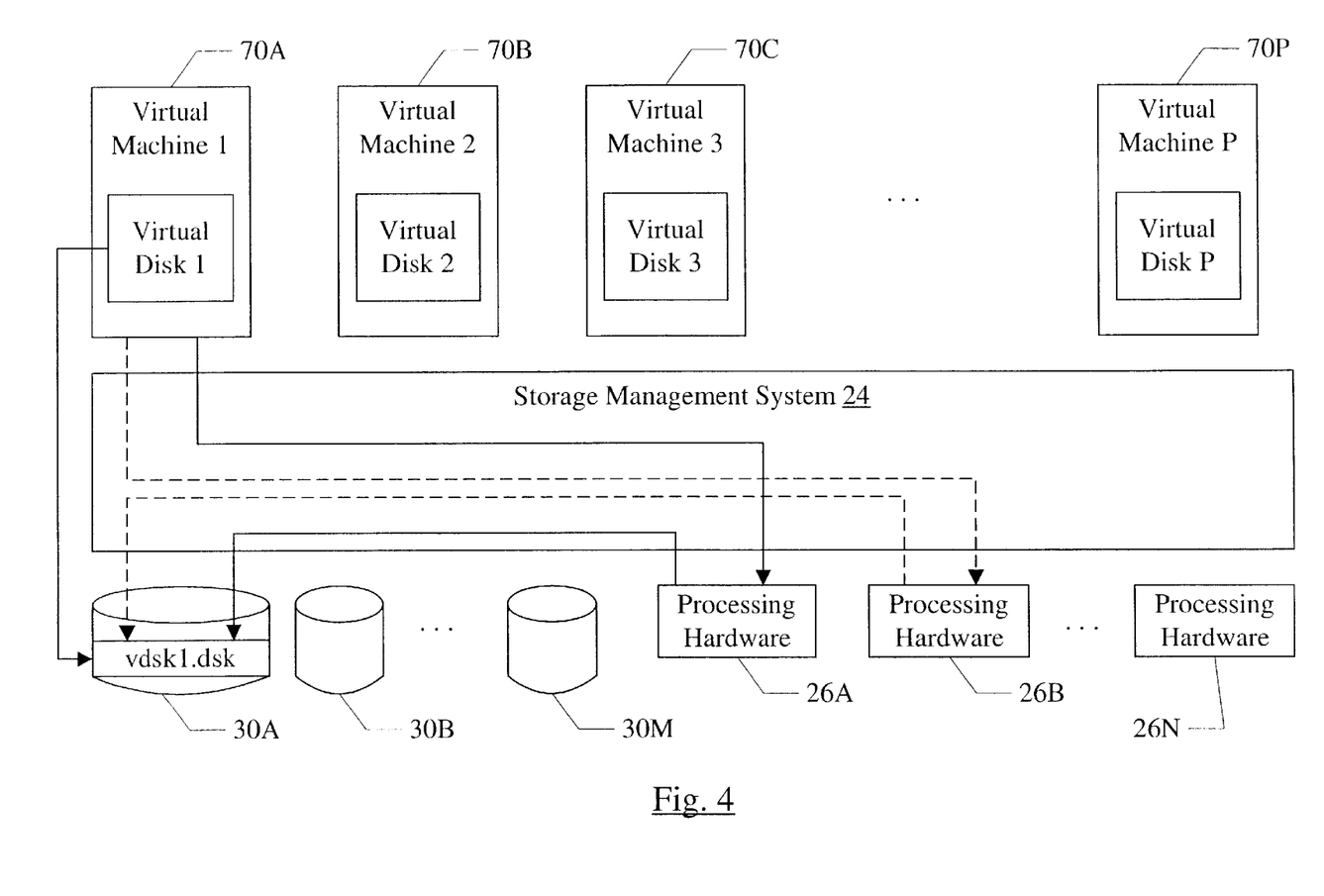
FIG. 4 is a block diagram of one embodiment of the storage management system managing multiple processing hardware and multiple physical storage devices.

Turning now to FIG. 4, a block diagram of one embodiment of the storage management system 24 managing multiple processing hardware 26A–26N and multiple physical storage devices 30A–30M is shown. Other embodiments are possible and contemplated. In the illustrated embodiment, several virtual machines 70A–70P are also shown, each having at least one virtual storage device. FIG. 4 also illustrates that the virtual disk 1 (a virtual storage device in the virtual machine 70A) is mapped to the physical storage device 30A (the file vdsk1.dsk) in this embodiment. The volume containing the file vdsk1.dsk has been omitted for simplicity in FIG. 4.

The storage management system 24 is configured to manage the execution of the virtual machines 70A–70P on any of the processing hardware 26A–26N. At different points in time, the storage management system 24 may schedule a given virtual machine (e.g. the virtual machine 70A) for execution on different processing hardware 26A–26N. Independent of which processing hardware 26A–26N is selected, the storage management system 24 ensures that the virtual machine has a consistent view of storage. That is, the same virtual storage devices are made available within the virtual machine independent of which processing hardware 26A–26N is executing the virtual machine.

For example, at a first point in time, the virtual machine 70A may be scheduled by the storage management system 24 for execution on the processing hardware 26A (solid line from the virtual machine 70A to the processing hardware 26A). During execution, the processing hardware 26A accesses the virtual disk 1 in the virtual machine 70A with a storage command. The storage management system 24 traps the storage command, and causes the storage command to be processed to the file vdsk1.dsk on the physical storage device 30A (solid line from the processing hardware 26A to the physical storage device 30A). For example, if the storage command is a read, data is returned from the vdsk1.dsk file. If the storage command is a write, the vdsk1.dsk file is updated. Thus the data stored on the virtual storage device is accessed from the physical storage device 30A.

Subsequently, the virtual machine 70A may be suspended from the processing hardware 26A and may be scheduled for execution on different processing hardware (e.g. the processing hardware 26B—dotted line from the virtual machine 70A to the processing hardware 26B). The suspension of the virtual machine 70A may occur due to the storage management system 24 scheduling another virtual machine 70B–70P for execution on the processing hardware 26A, due to the detection of a failure and the failover of the virtual machine 70A, etc.

During execution, the processing hardware 26B accesses the virtual disk 1 in the virtual machine 70A with a storage command. Similar to the above discussion, the storage management system 24 traps the storage command, and causes the storage command to be processed to the file vdsk1.dsk on the physical storage device 30A (dotted line from the processing hardware 26B to the physical storage device 30A). Thus, the virtual machine 70A has a consistent view of its virtual storage independent of the processing hardware on which the virtual machine 70A executes.

The processing hardware 26A–26N may represent any processing hardware configuration including at least one processor per processing hardware. For example, each processing hardware 26A–26N may be a blade for a blade server. That is, the processing hardware 26A–26N may collectively comprise the blade server. Each processing hardware 26A–26N may be an enclosed computer system, wherein the computer systems are networked together.

Figure 5:
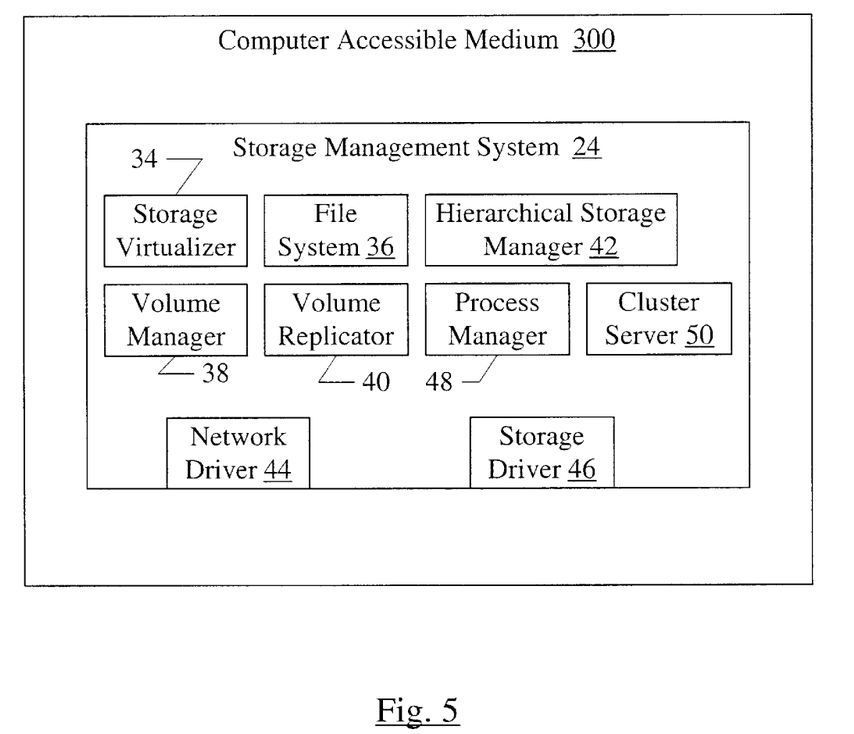
FIG. 5 is a block diagram of one embodiment of a computer accessible medium carrying one embodiment of the storage management system.

Turning now to FIG. 5, a block diagram of a computer accessible medium 300 including one or more pieces of software described above is shown. Generally speaking, a computer accessible medium may include storage media such as magnetic or optical media, e.g., disk or CD-ROM, volatile or non-volatile memory media such as RAM (e.g. SDRAM, RDRAM, SRAM, etc.), ROM, etc., as well as media accessed via transmission media or signals such as electrical, electromagnetic, or digital signals, conveyed via a communication medium such as a network and/or a wireless link.

As illustrated in FIG. 5, the computer accessible medium 300 may store the storage management system 24, including any storage management components or other software forming the storage management system 24 (e.g. the storage virtualizer 34, the file system 36, the hierarchical storage manager 42, the volume manager 38, the volume replicator 40, the process manager 48, the cluster server 50, the network driver 44 and/or the storage driver 46). In other embodiments, one or more of the storage management components or other software forming the storage management system 24 without other components/software which forms the storage management system 24. In other embodiments, the storage management system 24 may be stored in addition to one or more of the operation system 14, applications 12A–12B, etc.

It is noted that the operating system 14, the drivers 16, 18, 44, and 46, the applications 12A–12B, the storage management system 24 and the components thereof have been referred to herein as software, programs, code, etc. Generally, software, programs, code, etc. are intended to be synonymous herein, and refer to a sequence of instructions which, when executed, perform the functions assigned to the software, program, code, etc. The instructions may be machine level instructions from an instruction set implemented in a processor, or may be higher level instructions (e.g. shell scripts, interpretive languages, etc.).

Numerous variations and modifications will become apparent to those skilled in the art once the above disclosure is fully appreciated. It is intended that the following claims be interpreted to embrace all such variations and modifications.

What is claimed is:

1. An apparatus comprising:
   processing hardware;
   one or more physical storage devices;
   an operating system executable on the processing hardware; and
   a storage management system executable on the processing hardware, wherein the storage management system is configured to provide one or more virtual storage devices for use by the operating system, and wherein the storage management system is configured to map files representing the virtual storage devices to a plurality of volumes to be stored on the physical storage devices.

2. The apparatus as recited in claim 1 wherein the storage management system is further configured to map the plurality of volumes to the physical storage devices according to one or more volume attributes.

3. The apparatus as recited in claim 1 wherein the storage management system is further configured to replicate one or more of the plurality of volumes to a second one or more physical storage devices remote from the one or more physical storage devices.

4. The apparatus as recited in claim 1 wherein the storage management system is further configured to perform hierarchical storage management on the files representing the virtual storage devices.

5. The apparatus as recited in claim 1 further comprising network hardware coupled to the processor hardware, wherein at least one of the physical storage devices is coupled to the processing hardware through the network hardware.

6. The apparatus as recited in claim 1 wherein the storage management system is further configured to provide virtual network hardware for use by the operating system.

7. The apparatus as recited in claim 6 wherein the operating system communicates with at least one of the virtual storage devices through the virtual network hardware.

8. The apparatus as recited in claim 1 wherein the storage management system is further configured to schedule the operating system for execution on the processing hardware.

9. The apparatus as recited in claim 8 further comprising multiple processing hardware, wherein the storage management system is further configured to schedule the operating system for execution on a first processor hardware of the multiple processor hardware.

10. The apparatus as recited in claim 9 wherein the storage management system provides a same set of the virtual storage devices for use by the operating system independent of which of the multiple processor hardware on which the operating system is scheduled to execute.

11. The apparatus as recited in claim 8 further comprising an application configured to execute with the operating system, wherein the storage management system is further configured to schedule the application for execution on the processing hardware.

12. The apparatus as recited in claim 1 wherein the processing hardware includes one or more processors, and wherein a first processor on which the operating system is executing traps on commands to the virtual storage devices by the operating system, the trap occurring prior to the first processor transmitting the command external to the first processor.

13. A computer accessible medium comprising instructions which, when executed on processing hardware:
    provides one or more virtual storage devices for use by an operating system which is also executable on the processing hardware; and
    maps files representing the virtual storage devices to a plurality of volumes to be stored on physical storage devices coupled to the processing hardware.

14. The computer accessible medium as recited in claim 13 wherein the instructions, when executed, map the plurality of volumes to the physical storage devices according to one or more volume attributes.

15. The computer accessible medium as recited in claim 13 wherein the instructions, when executed, replicate one or more of the plurality of volumes to a second one or more physical storage devices remote from the one or more physical storage devices.

16. The computer accessible medium as recited in claim 13 wherein the instructions, when executed, perform hierarchical storage management on the files representing the virtual storage devices.

17. The computer accessible medium as recited in claim 13 wherein the instructions, when executed, provide virtual network hardware for use by the operating system.

18. The computer accessible medium as recited in claim 13 wherein the instructions, when executed, schedule the operating system for execution on the processing hardware.

19. The computer accessible medium as recited in claim 18 wherein the instructions, when executed, schedule the operating system for execution on a first processor hardware of multiple processor hardware.

20. The computer accessible medium as recited in claim 19 wherein the instructions, when executed, provide a same set of the virtual storage devices for use by the operating system independent of which of the multiple processor hardware on which the operating system is scheduled to execute.

21. A method comprising:
    providing one or more virtual storage devices for use by an operating system; and
    mapping files representing the virtual storage devices to a plurality of volumes to be stored on one or more physical storage devices.

22. The method as recited in claim 21 further comprising mapping the plurality of volumes to the physical storage devices according to one or more volume attributes.

23. The method as recited in claim 21 further comprising replicating one or more of the plurality of volumes to a second one or more physical storage devices remote from the one or more physical storage devices.

24. The method as recited in claim 21 further comprising performing hierarchical storage management on the files representing the virtual storage devices.

25. The method as recited in claim 21 further comprising providing virtual network hardware for use by the operating system.

26. The method as recited in claim 21 further comprising scheduling the operating system for execution.

27. The method as recited in claim 21 further comprising scheduling the operating system for execution on a first processor hardware of multiple processor hardware.

28. The method as recited in claim 27 further comprising providing a same set of the virtual storage devices for use by the operating system independent of which of the multiple processor hardware on which the operating system is scheduled to execute.

* * * * *